(12) United States Patent
Koga et al.

(10) Patent No.: US 6,577,686 B1
(45) Date of Patent: Jun. 10, 2003

(54) RECEIVER

(75) Inventors: Hisao Koga, Fukuoka (JP); Makoto Taromaru, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/417,179

(22) Filed: Oct. 12, 1999

(30) Foreign Application Priority Data

Oct. 13, 1998 (JP) ............................................. 10-290359

(51) Int. Cl.[7] ............................ H04B 1/69; H04L 27/06; H03D 1/04
(52) U.S. Cl. ..................... 375/347; 375/142; 375/200; 375/316; 375/346; 455/132
(58) Field of Search .............................. 375/142, 200, 375/347, 346, 316; 455/132, 296

(56) References Cited

U.S. PATENT DOCUMENTS

| | | | | |
|---|---|---|---|---|
| 5,757,845 A | * | 5/1998 | Fukawa et al. | 375/200 |
| 5,838,742 A | * | 11/1998 | Abu-Dayya | 375/347 |
| 5,991,273 A | * | 11/1999 | Abu-Dayya | 370/252 |
| 6,069,912 A | * | 5/2000 | Sawahashi et al. | 375/142 |
| 6,289,062 B1 | * | 9/2001 | Wang et al. | 375/346 |

FOREIGN PATENT DOCUMENTS

| | | | |
|---|---|---|---|
| JP | 07154129 | 6/1995 | ................. 375/347 |
| WO | WO97/20400 | 6/1997 | ................. 375/347 |

\* cited by examiner

*Primary Examiner*—Stephen Chin
*Assistant Examiner*—Sam Ahn
(74) *Attorney, Agent, or Firm*—RatnerPrestia

(57) ABSTRACT

The invention aims at adaptive array diversity reception of high convergence speed of combined weight by a simple signal processing, in a receiver by time division transmission system. Signals received by antennas (branches) are converted into base band signals in a receiving circuit, and are combined by a complex multiplying section and complex adder. The weight of the complex multiplying section is calculated by a weight calculating section. In the weight update algorithm of the weight calculating section, the step size in the least mean square is variable. That is, the initial value is set at a large value, and is decreased according to the lapse of time in each time slot, and is initialized at every change of time slot. As a result, by the same amount of calculation as in ordinary least mean square, the convergence speed of weight updating can be enhanced.

14 Claims, 4 Drawing Sheets

$G(n) = G(0) \cdot 0.75^n + B$ (B: constant)

A, B : constant

In the case of $n \leq k$

RECEIVER

FIELD OF THE INVENTION

The present invention relates to a receiver used in reception of digitally modulated radio frequency signal, for receiving the signal by plural antennas.

BACKGROUND OF THE INVENTION

Recently, in the field of mobile communication, digitization of radio communication is being promoted from the viewpoint of improvement of security and privacy, degree of congeniality with ISDN (integrated service digital network) or computer systems, effective use of frequency resources, etc. For effective use of frequency resources, it is preferred to utilize the radio wave of same frequency (channel) repeatedly at a minimum distance. However, if the distance of frequency re-use is shortened, it causes to increase the radio interference (co-channel interference) from the neighboring mobile station or base station using the same channel. As a result, the transmission quality is degraded.

In mobile communication, meanwhile, since fading occurs, the transmission quality, which is error rate in digital communication, is extremely degraded. Usually, the deterioration of transmission quality due to fading is compensated by space diversity reception which is implemented with two or more antennas and receiver circuits for diversity branches.

As branch combining method, that is, as the method of combining the signals issued from the plural receiver circuits into a combined signal, post-detection selection combining is the most common in which the detected branch output signal with the highest receiving signal strength (RSSI) is selected as the combined output. As another combining method which can further improve the receiving characteristic, post-detection maximum ratio combining is known. With the maximum ratio combining, the combined base band signal is made as the summation of the detected base band signal weighted by the RSSI at every branch.

Diversity reception is known not only to compensate for fading but also to suppress deterioration of transmission quality due to co-channel interference. To realize better performances against co-channel interference, adaptive array diversity, which is sometimes called adaptive diversity, optimum combining diversity, minimum mean square error combining diversity or least mean square adaptive array, is proposed. Examples of such receivers are disclosed in Japanese Laid-open Patent No. 7-154129 and Japanese Laid-open Patent No. 9-820400. These adaptive array diversity techniques can reduce the deterioration due to co-channel interference so the spectrum efficiency is enhanced.

In the adaptive array diversity receivers, for each diversity branch, there is a receiver circuit converting the receiving signals from the antenna into a base band signal which is not detected coherently. For the k-th branch (k=1, 2, . . . , K), the base band signal Xk is multiplied by a complex weight Wk and summed with the weighted base band signals from the other branches for combining. The Wk is calculated to adjust the phase and the amplitude of each branch in order to intensify the desired signal and to cancel or reduce the interference signal and noise at the combining output. By comparing this combined base band signal with a proper threshold value, demodulated data is decided and extracted.

Herein, those weights. (W1, W2, . . . ) are updated iteratively with X1, X2, . . . and the error signal E between the reference signal and the signal after being combined so that the error becomes small, or that the absolute value of the combining becomes constant.

As the weight update algorithm, the least mean square (LMS) algorithm or the recursive least mean square (RLS) algorithm can be used as well as for the linear equalizers with a tapped delay line. These are disclosed in the publication, Simon Haykin, Adaptive Filter Theory, 3rd edition, Prentice Hall, Upper Saddle River, N.J., 1996, for example. Among those algorithms, the LMS algorithm according to formula 1 is the simplest in calculation and is used frequently.

$$W_m(n) = W_m(n-1) + \mu X_m(n-1)E*(n-1) \quad \text{Formula 1}$$

$$(n = 0, 1, 2, \ldots )$$

$$E(n) = D(n) - \sum_{m=1}^{M} W_m*(n)X_m(n)$$

W: complex weight $\mu$: fixed step size

X: complex base band signal

E: complex error signal

D: complex reference signal m: number of branches n: number of symbols

*: complex conjugate

Herein, n is the time in the unit of the number of symbols from the beginning of the training sequence (training signals), and $\mu$ is the step size. For example, International Laid-open Patent WO97/20400 discloses the diversity receiver having the LMS applied in the spectrum diffusion communication. It is known that the convergence speed becomes fast if $\mu$ is set large, but the residual error after convergence and the stability deteriorates. To the contrary, the characteristic after convergence is good when $\mu$ is small. Accordingly, $\mu$ is generally set smaller although the convergence speed is somewhat sacrificed.

In such conventional receiver, however, the problem is that the weight convergence speed is slow when the LMS is used as the weight update algorithm. On the other hand, the RLS algorithm can be used for fast convergence in place of the LMS. Nevertheless, a fast and complicated operation circuit is needed because the computation of the RLS is extremely complicated.

SUMMARY OF THE INVENTION

The invention is devised in the light of the above prior art, and it is hence an object thereof to present a receiver of adaptive array diversity capable of converging the weight at high speed.

To achieve this object, the receiver of the invention comprises:

(a) converting means provided individually in each antenna for converting the signal received on the antenna into a base band signal, (b) combining means for combining by multiplying this base band signal by the weight of complex number and adding the weighted base band signal, (c) deciding means for deciding the transmission symbol from the combined base band signal added and combined by this combining means, (d) reference signal generating means for generating a known symbol to be transmitted as a reference signal, (e) error detecting means for issuing an error signal between the combined base band signal and reference signal, and (f) weight calculating means for calculating the weight corresponding to each antenna from the error signal and base band signal, and updating this weight iteratively.

Thus constituted receiver of the invention is characterized by the operation in which:

(g) the updating amount of weight in the weight calculating means is the product of the error signal, step size function and each base band signal, (h) this step size function is a function becoming smaller depending on the lapse of time in each time slot, and (i) it is initialized every time the time slot is changed.

By thus constitution and operation, the receiver of the invention is small in the quantity of calculation, and is capable of converging the weight at high speed by using a simple algorithm.

DETAILED DESCRIPTION OF THE EXEMPLARY EMBODIMENT

Figure 1:
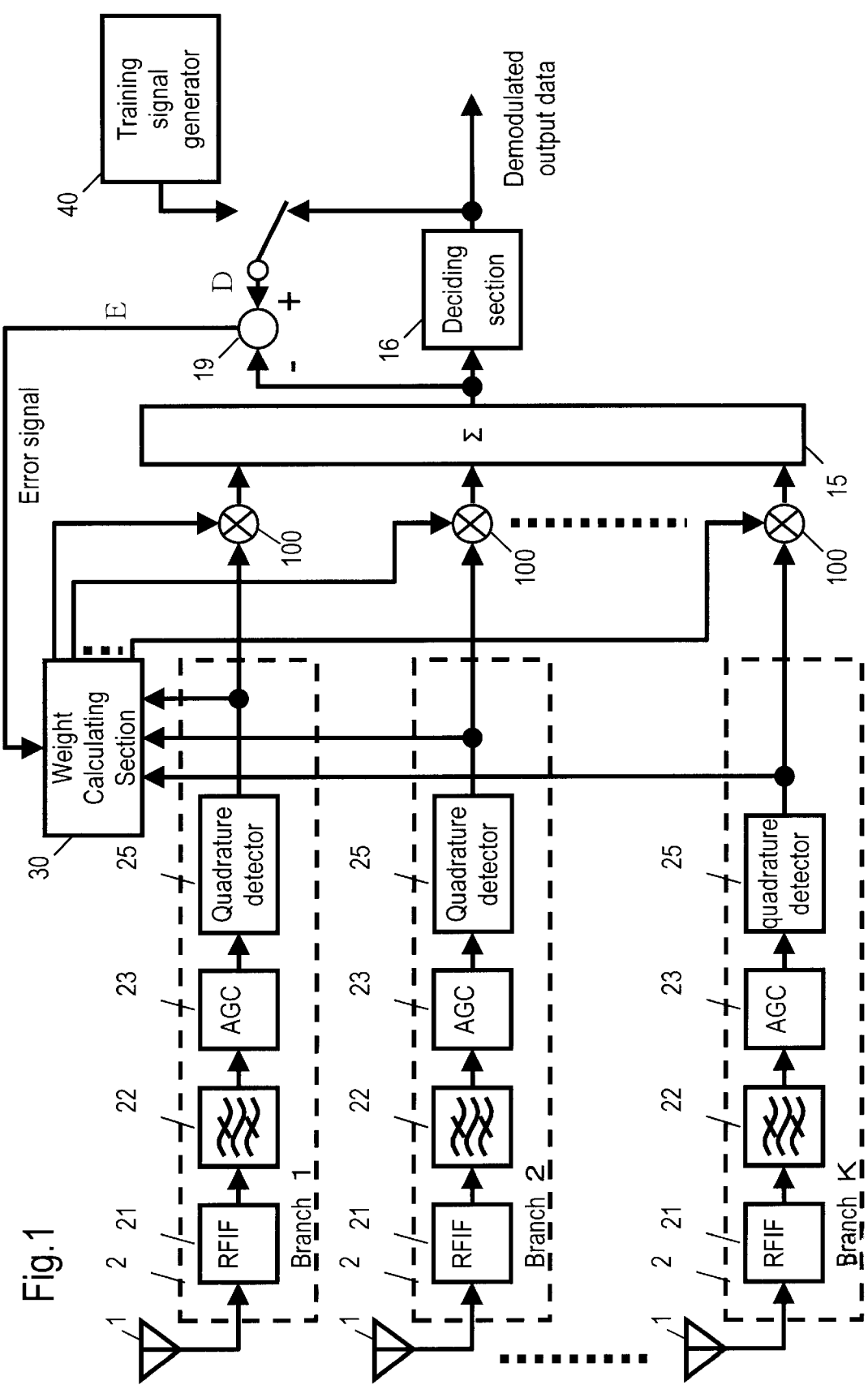
FIG. 1 is a structural diagram of a receiver in an embodiment of the invention.

Referring now to the drawings, an exemplary embodiment of the invention is described below.

Exemplary Embodiment

In FIG. 1, a receiving circuit 2 converts a receiving signal obtained in an antenna 1 in every branch into a complex base band signal. The receiving signal has been modulated in quadrature, and contains in-phase component and quadrature component. Herein, the complex base band signal is a signal composed of in-phase component and quadrature component corresponding to a real part and an imaginary part respectively. The receiving circuit 2 is mainly composed of a high frequency circuit 21, a band pass filter 22, an automatic gain control (AGC) amplifier 23, and a quadrature detector 25.

A weight calculating section (WCS) 30 calculates the complex weight of each branch. A complex multiplying section (CMS) 100 multiplies the complex base band signal issued from each receiving circuit 2 by the complex weight of each branch generated in the WCS 30. A complex adder (CA) 15 adds the complex base band signal issued from the receiving circuit 2 of each branch after passing through the CMS 100. A deciding section 16 compares the combined complex base band signal issued from the CA 15 with a proper threshold value, and decides the transmission data.

A training signal generator (TSG) 40 stores known data called training sequence. Herein, the known data is a fixed data sequence known to both the transmitter and the receivers. In this radio communication system, at the transmission side, known data (training sequence) is periodically inserted in part of the transmission data. The TSG 40 issues the base band signal containing the same data as the known data (training sequence). A complex decision error detecting section 19 issues the difference between the reference signal D and the complex base band signal combined in the CA 15 as an error signal E. Herein, the reference signal D is either the signal corresponding to the demodulated data decided in the deciding section 16, or the signal corresponding to the known data obtained from the TSG 40.

The operation is described below. First, receiving a signal by the antenna 1, the received signal is passed through the high frequency circuit 21, band pass filter 22, AGC amplifier 23, and quadrature detector 25. In this period, a complex base band signal is obtained, in which the in-phase component and quadrature component of receiving signal correspond to real part and imaginary part respectively. The complex base band signal Xk (k=1, 2, . . . , K) obtained from the receiving circuit 2 in every branch is weighted with the complex weight Wk from the WCS 30 in the CMS 100.

The complex base band signal of each branch weighted in the CMS 100 is combined in the CA 15. The deciding section 16 decides the data transmitted by comparing the combined complex base band signal with a proper threshold value. The transmitted data is issued from the deciding section 16 as demodulated data.

The TSG 40 generates the same data as the training sequence inserted in the transmission data. The complex decision error detecting section 19 determines the difference between the reference signal D which is an ideal complex base band signal, and the complex base band signal combined in the CA 15, and issues as error signal E. The reference signal D which is an ideal complex base band signal corresponds to the demodulated data decided in the deciding section 16 or the known data obtained from the TSG 40. The WCS 30 calculates the complex weight of each branch in the following formula 2.

$$W_m(n) = W_m(n-1) + G(n)X_m(n-1)E*(n-1) \qquad \text{Formula 2}$$

$$(n = 0, 1, 2, \dots )$$

$$E(n) = D(n) - \sum_{m=1}^{M} W_m*(n)X_m(n)$$

$$G(n) = \frac{\mu}{1-(1-\mu)^{n+1}}$$

G: step size function

Herein, * denotes the complex conjugate. G(n) is the step size function, and as clear: from the comparison with formula 1, supposing G(n) to be a fixed constant $\mu$, it is the same formula as LMS. Therefore, the quantity of computation is same as in formula 1, that is, the conventional LMS algorithm.

Figure 2:
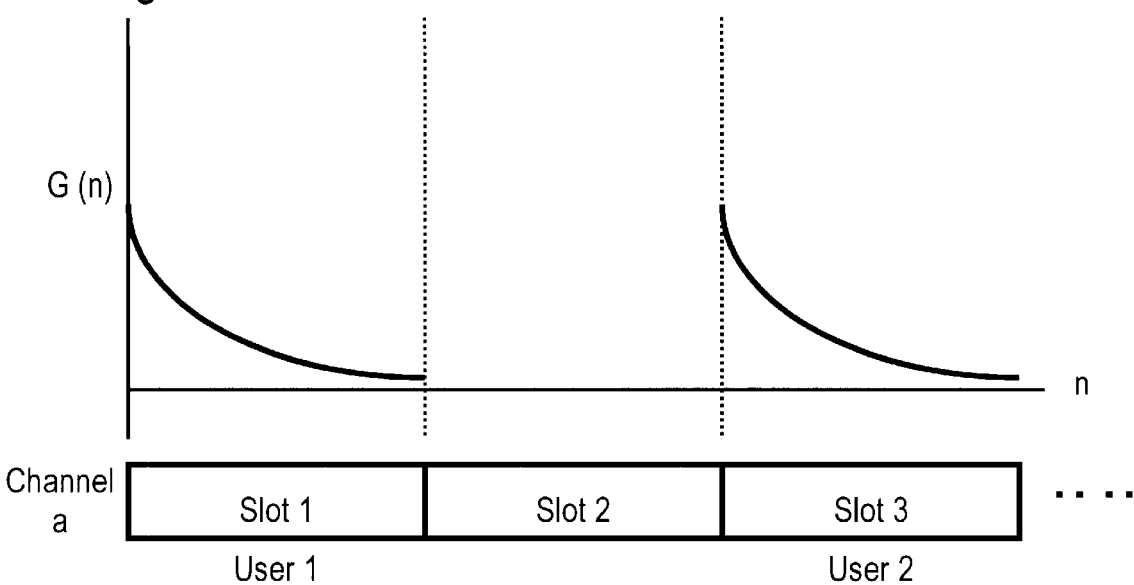
FIG. 2 is an operation diagram of step size function of the receiver in the embodiment of the invention.

The step size function G(n) is described below. In the case of digital communication, meanwhile, regardless of the access method, the transmission data is often transmitted as being divided into blocks called time slots. FIG. 2 shows an example of communication by using slot 1 and slot 3 between user 1 (opposite station 1) and user 2 (opposite station 2). Generally, at the beginning of the time slot, known data called pilot signal (training signal) or preamble is inserted. In the example in FIG. 2, slot 2 is not used.

As shown in FIG. 2, at the beginning of each slot, the step size function G(n) is initialized (n=0) to start from G(0). G(n) is a function very close to or coinciding with the small value $\mu$ so that the characteristic after convergence may be sufficiently obtained in the usual LMS along with the increase of the value of n. As shown in FIG. 2, it decreases in the period of one slot to be very close to or coincide with the value $\mu$. The initial value G(0) of this function is generally G(0)>$\mu$ in order to accelerate convergence in the initial phase. In formula 2, G(n) is its example.

In mobile communication, the propagation characteristic often fluctuates due to fading, and in the TDMA system, since the opposite station differs in each slot, the propagation environment differs in each slot. As mentioned above, by starting from G(0) after initializing the step size function G(n) at the beginning of each slot (n=0), it is applicable if the opposite station differs in each slot.

Meanwhile, if using the continuous slot for the same opposite station and when the fading fluctuation is small, it is not required to initialize the step size function in every slot.

In this way, by using the step size in the LMS algorithm as the function varying with the time not with the constant, the convergence in the initial phase is accelerated, and the characteristic after convergence can be set at a desired value. Therefore, the convergence speed can be increased by the same quantity of calculation as in ordinary LMS.

Incidentally, the step size function G(n) in formula 2 may not be calculated directly, but the result of prior calculation may be stored in the memory, and it may be read out from the memory when required. In this case, the quantity of calculation can be curtailed.

Instead of the function of formula 2, formula 3 expressed by the sum of the monotonously decreasing exponential function and the constant may be used as the step size function.

$$G(n) = r^n + B (n = 0, 1, 2, \ldots), \quad (0 < r < 1) \quad \text{Formula 3}$$

B: constant

Figure 3:
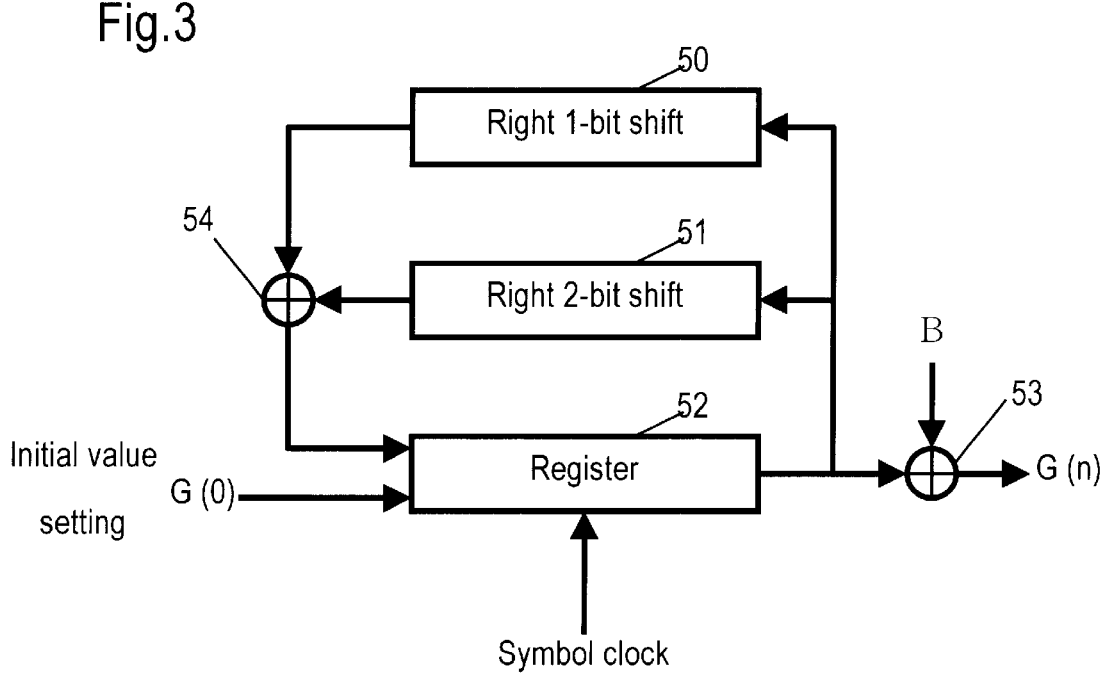
FIG. 3 is a circuit diagram for realizing the sum of the monotonously decreasing exponential function and constant of the receiver in the embodiment of the invention.

When generating this function in the hardware, the operation of G(n) can be done by the sum of the bit shift, and it is realized in the constitution shown in FIG. 3. In FIG. 3, the operation for calculation is described.

Figure 4:
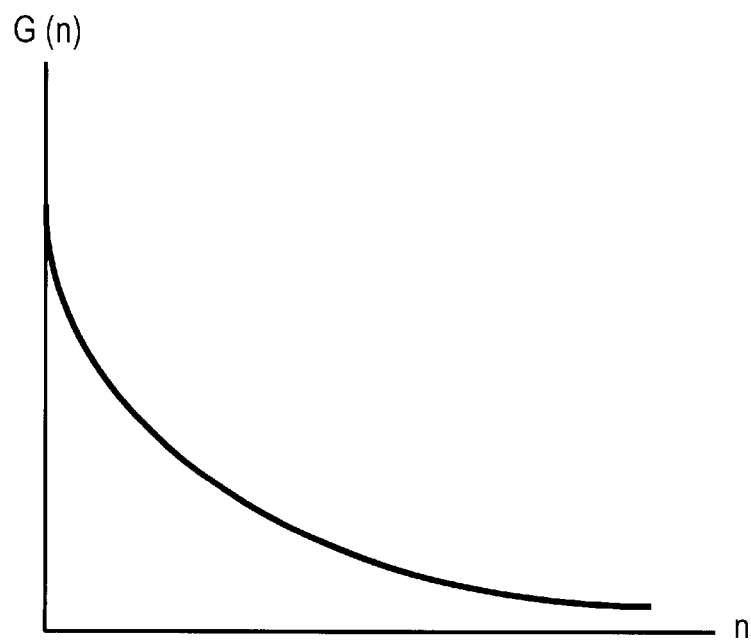
FIG. 4 is a graph showing an example of the monotonously decreasing exponential function of the receiver in the embodiment of the invention.

First, an initial value is entered in a register 52. It is issued to the adder 53 from the register 52, and constant B is added, and the sum is issued as step size function. The output of the register 52 is put into a right 1-bit shift circuit 50 and a right 2-bit shift circuit 51, and multiplied by 0.5 times and 0.25 times in each circuit, and summed up in an adder 54, and the sum is put into the register 52. In this case, the graph of G(n) is shown in FIG. 4. It realizes G(n) expressed by the sum of the monotonously decreasing exponential function and constant. In this case, instead of the memory for preliminarily storing G(n), since G(n) can be generated by the simple circuit as shown above, and the circuit scale can be curtailed.

Or, as the step size function G(n), formula 4 expressed by the monotonously decreasing linear function may be used as the step size function.

$$G(n) = c \cdot n + d \quad (n \leq k) \quad \text{Formula 4}$$
$$G(n) = z \quad (n > k) \quad (n = 0, 1, 2, \ldots)$$
$$c, d, k, z: \text{constant.}$$
$$c > 0$$

Figure 5:
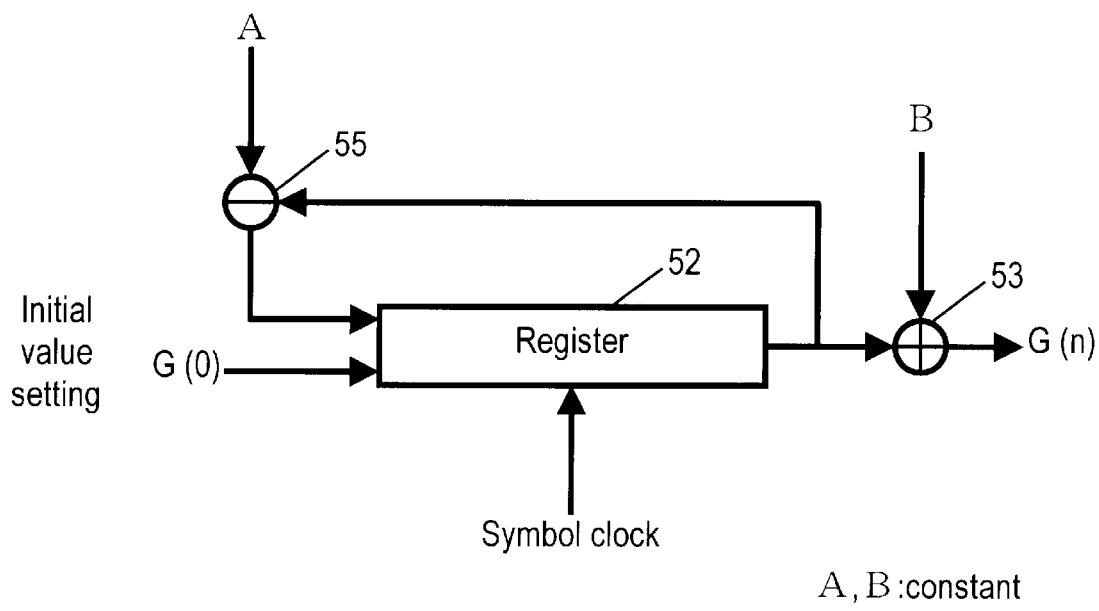
FIG. 5 is a circuit diagram for realizing a monotonously decreasing linear function of the receiver in the embodiment of the invention.

The constitution for generating this function by the hardware is shown in FIG. 5. In FIG. 5, the calculating operation is described.

Figure 6:
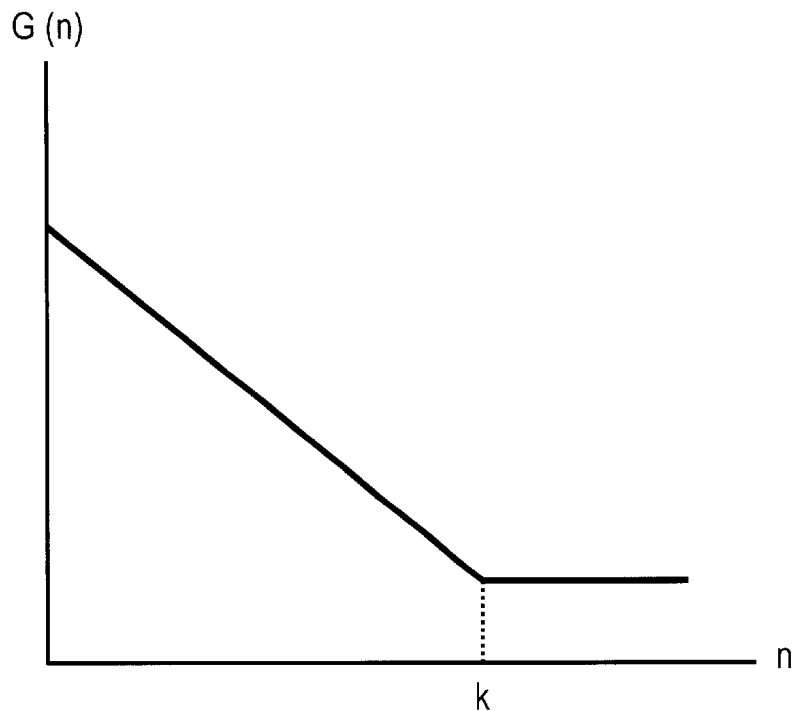
FIG. 6 is a graph showing an example of a monotonously decreasing linear function of the receiver in the embodiment of the invention.

First, the initial value of the register 52 is set. It is issued from the register 52 to the adder 53, and constant B is added and the sum is issued as step size function. The output of the register 52 is combined with constant A in a subtractor 55, and put into the register 52. The graph of G(n) in this case is shown in FIG. 6. In this case, too, instead of the memory for preliminarily storing G(n), since G(n) can be generated by such simple circuit, the circuit scale can be curtailed.

Further, normalizing the second term of formula 2, that is, the complex base band signal by the sum of the receiving signal power of antennas or the maximum value among the received power of antennas, formula 5 or formula 6 may be used as weight update algorithm.

$$W_m(n) = W(n-1) + \frac{1}{\sum_{m=1}^{M} X_m*(n-1)X_m*(n-1)} G(n) X_m(n-1) E*(n-1) \quad \text{Formula 5}$$
$$(n = 0, 1, 2, \ldots)$$
$$E(n) = D(n) - \sum_{m=1}^{M} W_m*(n) X_m(n)$$

$$W_m(n) = W(n-1) + \frac{1}{\max_{m=1}^{M}\{X_m*(n-1)X_m(n-1)\}} G(n) X_m(n-1) E*(n-1) \quad \text{Formula 6}$$
$$E(n) = D(n) - \sum_{m=1}^{M} W_m*(n) X_m(n) \quad (n = 0, 1, 2, \ldots)$$
$$\max\{Am\}: \text{maximum value of } A1, A2, \ldots, AM.$$

In this case, supposing the step size function in formula 5 as the fixed constant, the normalized LMS (NLMS) is equivalent to the formula called the learning identification method. The NLMS is known as the algorithm for accelerating the LMS, and the invention may be also applied easily to the NLMS as mentioned above. As a result, the weight update algorithm may be converged at much higher speed.

Meanwhile, normalizing the step size function G(n) of the second term of formula 2 by the sum of the receiving signal power of antennas or the initial value of the maximum value among the receiving power of antennas (the value upon start of communication or at the beginning of slot), formula 7 or formula 8 may be also used as the weight update algorithm.

$$W_m(n) = \quad \text{Formula 7}$$
$$W(n-1) + \frac{1}{\sum_{m=1}^{M} X_m*(0)X_m(0)} G(n)X_m(n-1)E*(n-1)$$
$$(n = 0, 1, 2, \dots)$$
$$E(n) = D(n) - \sum_{m=1}^{M} W_m*(n)X_m(n)$$

$$W_m(n) = \quad \text{Formula 8}$$
$$W(n-1) + \frac{1}{\max_{m=1}^{M}\{X_m*(0)X_m(0)\}} G(n)X_m(n-1)E*(n-1)$$
$$E(n) = D(n) - \sum_{m=1}^{M} W_m*(n)X_m(n)$$

As a result, the weight update algorithm is converged at further higher speed, and the quantity of calculation can be curtailed.

Figure 7:
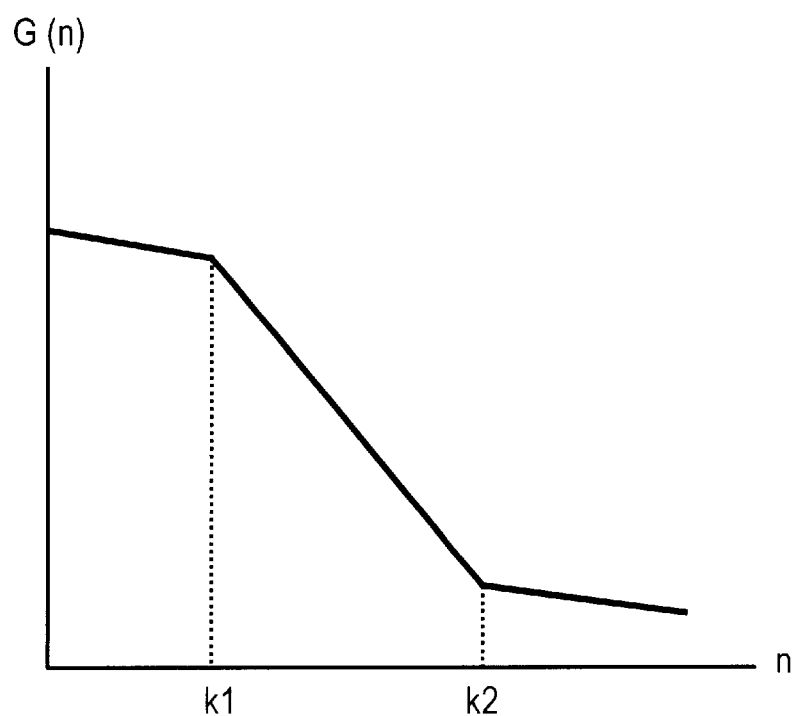
FIG. 7 is a graph showing an example of combining plural linear functions of the receiver in the embodiment of the invention.

As the step size function $G(n)$, moreover, the step size function compound plural linear functions may be used. An example of $G(n)$ in this case is shown in FIG. 7. In FIG. 7, the step size function is a first linear function decreasing monotonously in the initial interval ($n \leq k1$), and is a second linear function having a larger rate of change than the first linear function in an intermediate interval ($k1 < n \leq k2$). In an interval of $n > k2$, it may be either other linear function or a constant value.

Thus, in the invention, by using the step size function $G(n)$ for the LMS algorithm in adaptive array diversity reception, a high convergence speed equivalent to that of RLS is realized by a nearly same quantity of calculation as in ordinary LMS.

What is claimed is:

1. A receiver in time division transmission system for transmitting data by dividing in time into blocks called time slots, comprising:
   (a) converting means provided individually in plural antennas for converting the signal received on each antenna into a base band signal,
   (b) combining means for weighting said base band signal by the weight of complex number and for summing said weighted base band signal with the other said weighted base band signal,
   (c) deciding means for deciding the transmission symbol from the combined base band signal added and combined by said combining means,
   (d) reference signal generating means for generating a known symbol to be transmitted as a reference signal,
   (e) error detecting means for issuing an error signal between said combined base band signal and reference signal, and
   (f) weight calculating means for calculating the weight corresponding to each antenna from said error signal and base band signal, and updating this weight sequentially,
   wherein the updating amount of each weight in said weight calculating means is the product of said error signal, step size function and each base band signal, and
   said step size function is a function becoming smaller according to the lapse of time in each time slot, and is initialized at every change of time slot.

2. A receiver of claim 1, wherein said weight calculating means has a read-only memory, and said step size function is stored in said read-only memory.

3. A receiver of claim 1, wherein said step size function is the sum of a monotonously decreasing exponential function and a constant.

4. A receiver of claim 1, wherein said step size function is a linear function decreasing monotonously until a proper time, and remains a constant value after said time.

5. A receiver of claim 1, wherein said step size function consists of a first linear function decreasing monotonously until a first time, and a second linear function changing at a larger rate than said first linear function until a next time.

6. A receiver of claim 1, wherein said step size function is multiplied by the constant inversely proportional to the sum of receiving signal power values of each antenna or the maximum value among the receiving power values of each antenna.

7. A receiver in time division transmission system for transmitting data by dividing in time into blocks called time slots, comprising:
   (a) plural antennas,
   (b) converting means provided in each antenna for converting the signal received in the antenna into a base band signal,
   (c) combining means for weighting said base band signal by the weight of complex number and for summing said weighted base band signal with the other said weighted base band signal,
   (d) deciding means for deciding the transmission symbol from the combined base band signal added and combined by said combining means,
   (e) reference signal generating means for generating a known symbol to be transmitted as a reference signal,
   (f) error detecting means for issuing an error signal between said combined base band signal and reference signal, and
   (g) weight calculating means for calculating the weight corresponding to each antenna from said error signal and base band signal, and updating this weight sequentially,
   wherein the updating amount of each weight in said weight calculating means is the product of said error signal, step size function and each base band signal corresponding to each antenna, and
   said step size function is converged to a constant value along with the time in each time slot, and is initialized at every change of time slot.

8. A receiver receiver in time division transmission system for transmitting data by dividing in time into blocks called time slots, comprising:
   (a) plural antennas,
   (b) quadrature detecting means provided in each antenna for detecting in quadrature the signal received in the antenna and issuing a base band signal of in-phase component and quadrature component,
   (c) combining means for weighting said base band signal by the weight of complex number, with the in-phase component and quadrature component of said base band signal being respectively as real part and imaginary part of complex number, and for summing said weighted base band signal with the other said weighted base band signal,
   (d) deciding means for deciding the transmission symbol from the combined base band signal added and combined by said combining means, (e) reference signal generating means for generating a known symbol to be transmitted as a reference signal, (f) error detecting means for issuing an error signal between said combined base band signal and reference signal, and (g) weight calculating means for calculating the weight corresponding to each antenna from said error signal and base band signal, and updating this weight sequentially, wherein the updating amount of each weight in said weight calculating means is the product of said error signal, step size function and each base band signal corresponding to each antenna, and the absolute value of said step size function is converged to a constant value along with the time, said step size function is initialized at every change of time slot, and the absolute value of the initial value is larger than the converged constant value.

9. A receiver of claim 8, wherein said weight calculating means has a read-only memory, and said step size function is stored in said read-only memory.

10. A receiver of claim 8, wherein said step size function is the sum of a monotonously decreasing exponential function and a constant.

11. A receiver of claim 8, wherein said step size function is a linear function decreasing monotonously until a proper time, and remains a constant value after said time.

12. A receiver of claim 8, wherein said step size function consists of a first linear function decreasing monotonously until a first time, and a second linear function changing at a larger rate than said first linear function until a next time.

13. A receiver in time division transmission system for transmitting data by dividing in time into blocks called time slots, comprising:

(a) plural antennas, (b) quadrature detecting means provided in each antenna, for receiving a high frequency signal received by the antenna or an intermediate frequency signal converted in frequency from the high frequency signal, detecting in quadrature said high frequency signal or said intermediate frequency signal by a local signal of a nearly same frequency as the nominal carrier frequency of said high frequency signal or said intermediate frequency signal, and issuing a base band signal of in-phase component and quadrature component, (c) combining means for weighting said base band signal by the weight of complex number, with the in-phase component and quadrature component of said base band signal being respectively as real part and imaginary part of complex number, and for summing said weighted base band signal with the other said weighted base band signal, (d) deciding means for deciding the transmission symbol from the combined base band signal added and combined by said combining means, (e) reference signal generating means for generating a known signal portion contained in the receiving signal and the base band signal corresponding to the deciding result of said deciding means as a reference signal, (f) error detecting means for issuing an error signal between said combined base band signal and reference signal, and (g) weight calculating means for calculating the weight corresponding to each antenna from said error signal and base band signal, and updating this weight sequentially, wherein the updating amount of each weight in said weight calculating means is the product of said error signal, step size function and each base band signal corresponding to each antenna, and the absolute value of said step size function is converged to a constant value along with the time, said step size function is initialized at every change of time slot, and the absolute value of the initial value is larger than the converged constant value.

14. A receiver of claim 13, wherein said step size function is multiplied by the constant inversely proportional to the sum of receiving signal power values of each antenna or the maximum value among the receiving power values of each antenna.

* * * * *